United States Patent
Uthaman et al.

(10) Patent No.: US 10,805,652 B1
(45) Date of Patent: Oct. 13, 2020

(54) STATEFUL SERVER-LESS MULTI-TENANT COMPUTING AT THE EDGE

(71) Applicant: Amazon Technologies, Inc., Seattle, WA (US)

(72) Inventors: Karthik Uthaman, Seattle, WA (US); Alexander Korobeynikov, Bellevue, WA (US); Ronil Sudhir Mokashi, Mercer Island, WA (US); Prashant Verma, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 19 days.

(21) Appl. No.: 16/370,712

(22) Filed: Mar. 29, 2019

(51) Int. Cl.
  *G06F 15/173* (2006.01)
  *H04N 21/24* (2011.01)
  *H04N 21/231* (2011.01)
  *H04N 21/222* (2011.01)
  *H04N 21/647* (2011.01)
  *H04N 21/643* (2011.01)

(52) U.S. Cl.
  CPC ........... *H04N 21/24* (2013.01); *H04N 21/222* (2013.01); *H04N 21/23103* (2013.01); *H04N 21/23106* (2013.01); *H04N 21/64723* (2013.01); *H04N 21/643* (2013.01)

(58) Field of Classification Search
  None
  See application file for complete search history.

(56) References Cited

U.S. PATENT DOCUMENTS

| | | | |
|---|---|---|---|
| 2007/0245409 A1* | 10/2007 | Harris | H04L 69/10 726/5 |
| 2012/0089700 A1* | 4/2012 | Safruti | H04L 67/2842 709/217 |
| 2013/0019311 A1* | 1/2013 | Swildens | G06F 9/505 726/23 |
| 2013/0041946 A1* | 2/2013 | Joel | H04L 67/42 709/203 |
| 2015/0281111 A1* | 10/2015 | Carl | H04L 47/70 709/226 |
| 2016/0337426 A1* | 11/2016 | Shribman | H04L 65/608 |
| 2017/0374151 A1* | 12/2017 | Moorthi | H04L 67/1097 |
| 2018/0091578 A1* | 3/2018 | Bendell | H04L 67/02 |
| 2018/0316778 A1* | 11/2018 | Tucker | H04L 67/02 |
| 2018/0367637 A1* | 12/2018 | Balazinski | H04N 21/64322 |

* cited by examiner

*Primary Examiner* — Phyllis A Book
(74) *Attorney, Agent, or Firm* — Nicholson De Vos Webster & Elliott, LLP

(57) ABSTRACT

Techniques for stateful computing at the edge of a content delivery network are described. In some embodiments, a point of presence of the content delivery network includes proxy servers, function execution units, and function state cache servers executing on computer systems within the point of presence. A proxy server checks for requests for resources hosted on behalf of customers of the content delivery network that trigger a customer-specified function. When a function is triggered, the proxy server selects an execution unit and sends a function execution request to the execution unit. The execution unit executes functions of many different customers of the provider network. Upon receiving a request to execute a function that is stateful, the execution unit retrieves the function state from a function state cache server, execute the function, and returns a result to the proxy server.

20 Claims, 7 Drawing Sheets

```
                        FUNCTION 500

'USE STRICT';

EXPORTS.HANDLER = (EVENT, CONTEXT, CALLBACK) => {
  CONST RESPONSE = EVENT.RECORDS[0].CF.RESPONSE;

/**
   * THIS FUNCTION UPDATES THE RESPONSE STATUS TO 200 AND GENERATES STATIC
   * BODY CONTENT TO RETURN TO THE VIEWER IN THE FOLLOWING SCENARIO:
   * 1. THE FUNCTION IS TRIGGERED IN AN ORIGIN RESPONSE
   * 2. THE RESPONSE STATUS FROM THE ORIGIN SERVER IS AN ERROR STATUS CODE (4XX OR 5XX)
   */

IF (RESPONSE.STATUS >= 400 && RESPONSE.STATUS <= 599) {
    RESPONSE.STATUS = 200;
    RESPONSE.STATUSDESCRIPTION = 'OK';
    RESPONSE.BODY = 'BODY GENERATION EXAMPLE';                    ⎫ 505
    SETSTATE(GETSTATE(CONTEXT.INVOKEDFUNCTIONID).NUMERRORS++);    ⎭
  }

CALLBACK(NULL, RESPONSE);
};
```

*FIG. 5*

STATEFUL SERVER-LESS MULTI-TENANT COMPUTING AT THE EDGE

BACKGROUND

Content delivery networks (CDNs) geographically distribute content to improve the user experience of accessing content on a network. In particular, the performance of widespread networks such as the internet is limited in part by the physical distance separating two computer systems. As that distance increases, the amount of time for a signal to transmit between the computer systems increases as does (typically) the number of routing hops, each hop or intermediate computer system introducing delay. Furthermore, if a single computer system hosts the requested content, a failure of that computer system prevents the content from being delivered to all users. CDNs reduce delays and points of failure by maintaining computer equipment to host and provide content at many locations, sometimes called "points of presence" or POPs. For example, a CDN customer may host a web page with the CDN. The CDN replicates the web page in many locations, such as a POP in Tokyo and another in London so that a user in the United Kingdom would receive the web page from the London POP while a user in Japan would receive the web page from the Tokyo POP.

BRIEF DESCRIPTION OF DRAWINGS

Various embodiments in accordance with the present disclosure will be described with reference to the following drawings.

FIG. 5 is an exemplary stateful function for execution at the edge according to some embodiments.

DETAILED DESCRIPTION

Figure 1:
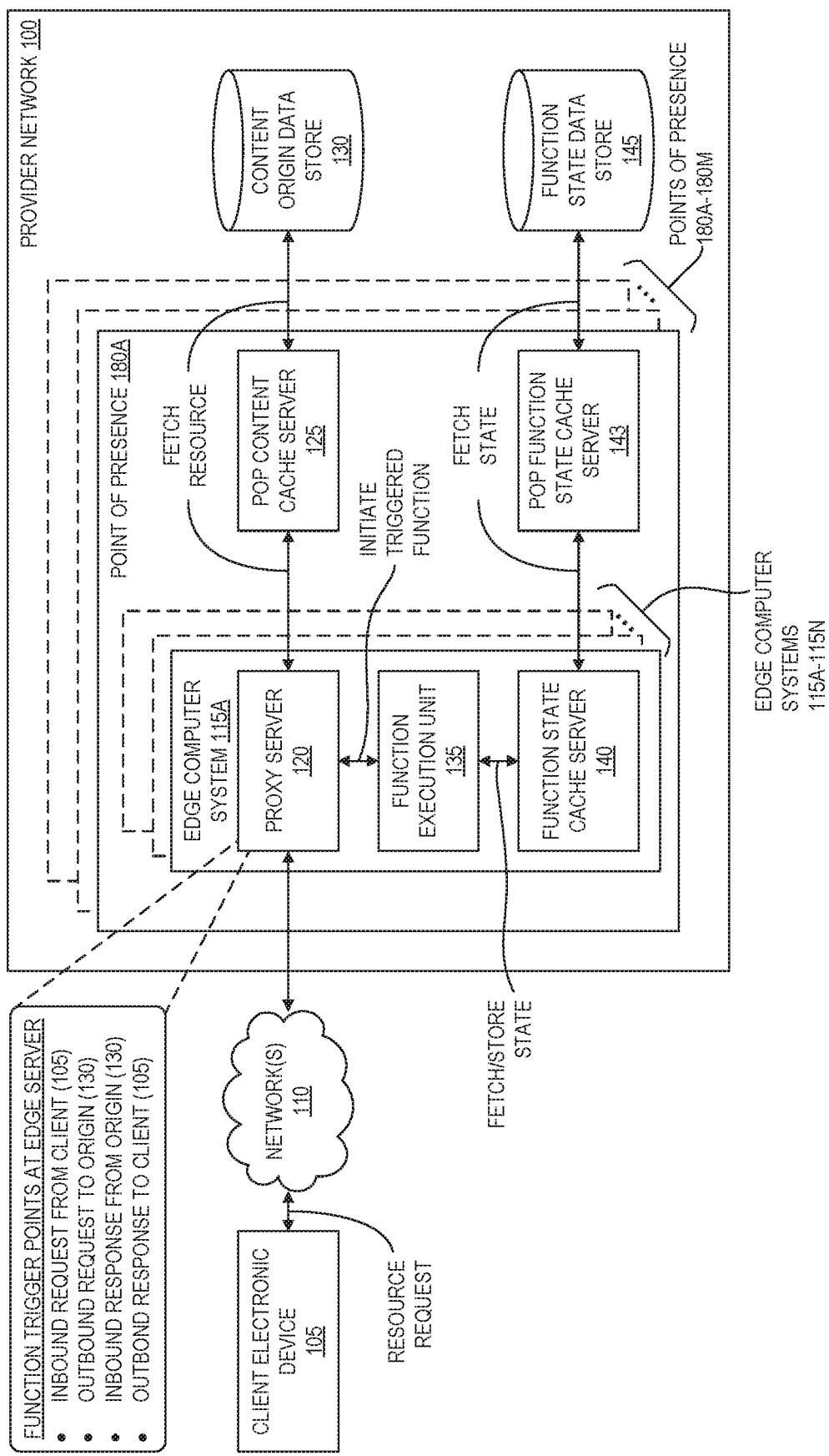
FIG. 1 is a diagram illustrating an environment for stateful computing at the edge according to some embodiments.

Various embodiments of methods, apparatus, systems, and non-transitory computer-readable storage media for stateful computing at the edge are described. According to some embodiments, a provider network provides content distribution services via points of presence (POPs)—sometimes referred to as edge locations—that are geographically dispersed. Customers of the operator of the provider network can host their content within the provider network, and the provider network facilitates the distribution of that content to the customer's users. A user's request for content is routed to a proxy server within a POP that is geographically proximate to the source of the request, and the proxy server fulfills the request from content cached within the POP, if available. Typically, the customer can track and manage its content and content distribution to users in an off-line manner or with a backend service that involve considerable delay. That is, the customer can aggregate data related to content distribution and adjusts the content and/or behavior of the content distribution based on the aggregated data. Such approaches, however, limit the responsiveness of the content and/or content distribution to the customer's users.

Aspects of the present disclosure introduce a function execution unit and a function state cache server that operate in conjunction with a proxy server to allow stateful computing at the edge. Customers can configure the provider network to invoke customer-specified functions at the edge locations handling content requests. Such functions can preserve and restore state (e.g., one or more variables) between executions. By introducing stateful execution at the edge, the customer can increase the responsiveness of its content by making decisions on-line with the content distribution process rather than off-line based on aggregated data. For example, a customer can deploy a stateful function that tracks how many times product pages on its e-commerce site are accessed by persisting a counter. Each time a particular product page is accessed, the function can fetch a counter value, increment it, and store the counter value. The customer can use those counter values to adjust the ranking of popular products displayed on other product pages as part of executing the function. As another example, a customer can deploy a stateful function that tracks how many times a user has accessed the site to enforce paywall type restrictions (e.g., a news organization permitting up to five free articles per month).

According to some embodiments, a proxy server evaluates function triggering conditions at points associated with inbound and outbound communications associated with content distribution. When the condition(s) to execute a function are satisfied, the proxy server sends a message to a function execution unit to execute the function. If the function is stateful—i.e., references a saved state—the function execution unit retrieves the state associated with the function from a function state cache server that has cached or can retrieve the state. In some embodiments, the stateful function execution is considered "server-less" in that no dedicated compute or hardware resources of the POP are earmarked for execution of a specific function. That is, the provider network does not launch a virtual machine or container within which to execute the function. In some embodiments, the stateful computing also is considered "multi-tenant" in that the function execution unit can execute the functions of many different customers of the provider network.

According to some embodiments, many proxy servers, function execution units, and function state cache servers form an application-level mesh to allow sharing of the limited amount of compute and memory resources available on the underlying computer systems that host such applications. To share compute capacity of the POP, function execution units can send their status (e.g., as a binary indicator of busy or not busy; or as a level indicating an amount of available compute overhead or number of queued functions, etc.) to the proxy servers. Based on the status information, a proxy server can select a function execution unit for execution of a triggered function that is available or has a low workload relative to other function execution units. To share memory capacity of the POP, state information can be distributed amongst the function state cache servers using a hashing mechanism. A function execution unit can locate the function state cache server storing the state of a given function (if cached) by hashing a unique identifier associated with the state.

FIG. 1 is a diagram illustrating an environment for stateful computing at the edge according to some embodiments. As shown, a provider network 100 includes one or more points of presence (POPs) 180A to 180M to facilitate content distribution by caching content closer to end-users (e.g., the provider network 100 is operating a CDN). That is, POPs 180 represent geographically dispersed portions of the provider network 100, each capable of serving cached content to end-user. Such content can include, for example, the web site of a customer of the operator of the provider network 100. For example, Company A can host its website—www.companya.com—with the provider network 100. The website content—e.g., text, images, scripts, video, markup, or other data—can be stored in a content origin data store 130. In some embodiments, the content origin data store 130 is a volume of a storage service that provides data/storage resources (e.g., object storage, block-level storage, data archival storage, databases and database tables, etc.) using non-volatile storage media such as solid-state drives (SSDs). The content origin data store 130 serves as the content source for caching by the POPs 180. In some embodiments, the content origin data store 130 is located within one of the POPs 180.

A user can initiate a request for content hosted by the provider network 100 by, for example, commanding a web browser application executing on a client electronic device 105 to issue a HyperText Transfer Protocol (HTTP)-based request for content. Examples of such client electronic devices include personal computers (PCs), cell phones, handheld messaging devices, laptop computers, set-top boxes, personal data assistants, electronic book readers, wearable electronic devices (e.g., glasses, wristbands, monitors), and the like. The request may traverse one or more intermediate networks 110, such as the internet. In this example, the requested content may be Company A's web page as identified by a Uniform Resource Locator (URL) or, more generally, a Uniform Resource Identifier (URI). Based on an estimate or approximation of the location of the client electronic device 105 (e.g., using its Internet Protocol (IP)-address), a Domain Name System (DNS) server can provide a network address of an entry point of the POP 180 that can offer the user the best performance (e.g., due to geographic proximity). For example, POP 180A can be located in San Francisco, Calif., and POP 180G can be located in Chicago, Ill. Assuming the client electronic device 105 is estimated to be in Oakland, Calif., the request is routed to the POP 180A. A load balancer (not shown) may route the request to a proxy server 120 executed by one of a plurality of edge computer systems 115A through 115N (e.g., electronic devices) that facilitate content distribution from the POP.

In this example, the proxy server 120, executed by an edge computer system 115, receives the request from the client electronic device 105. The edge computer system 115 also executes a function execution unit 135 and a function state cache server 140. In other embodiments, one or more of the proxy server 120, the function execution unit 135, and the function state cache server 140 can be hosted by different computer systems. If hosted by a common computer system, the proxy server 120, the function execution unit 135, and/or the function state cache server 140 may execute within the same environment (e.g., operating system) or separate, virtualized environments (e.g., virtual machines, containers).

Communications between the proxy server 120, the function execution unit 135, and the function state cache server 140 can take place via a POP network or provider network 100 using an inter-process communications protocol, including network-based protocols such as Transmission Control Protocol (TCP) or User Datagram Protocol (UDP). For network communications, the proxy server 120, the function execution unit 135, and the function state cache server 140 can be separately addressed by a combination of an IP-address and port number. If one or more of the proxy server 120, the function execution unit 135, and the function state cache server 140 are executed within a virtualized environment with a virtual IP address, those executing within a virtualized environment may have a separate IP address even though hosted on the same underlying computer system 115A. In some embodiments, application level communications between the proxy server 120, the function execution unit 135, and the function state cache server 140 are HTTP-based. In some embodiments, communications between the proxy server 120, the function execution unit 135, and the function state cache server 140 include payloads in a binary rather than a text-based format to reduce the size of the data transfers.

Upon receiving the request for Company A's web page, the proxy server 120 obtains configuration data associated with the request. Note that since the proxy server 120 may be handling requests for many different customers of the provider network 100, there may be separate configuration data for each customer, for each resource, and/or for groups of resources. In some embodiments, the proxy server 120 fetches the configuration data from another service (not shown) within the POP 180. For example, the proxy server can send a message to a database frontend with the URI of the request to retrieve the associated configuration data.

The obtained configuration data includes data to locate the resource or content needed to fulfill the request from the client electronic device 105 (e.g., the location of index.html within the provider network 100). Based on the configuration data, the proxy server 120 can request the resource from a POP content cache server 125 that is backed by the content origin data store 130. Like the content origin data store 130, the POP content cache server 125 may be provided by a storage service of the provider network 100, as described herein. If the POP content cache server 125 has the resource cached, it returns the resource to the proxy server 120. If not, the POP content cache server 125 can fetch the resource from the content origin data store 130 and, once obtained, return the resource to the proxy server 120. In some embodiments, the POP content cache server 125 may return an indication of a resource miss to the proxy server 120 to either notify the proxy server 130 that the resource is being fetched from the content origin data store 130 or so that the proxy server 120 can fetch the resource from the content origin data store 130. Once the proxy server has obtained the resource, the proxy server 120 returns the resource to the client electronic device 105 to fulfill the request. Although FIG. 1 illustrates one variant of POP-based resource caching and request fulfillment, other CDN architectures are possible.

The configuration data can also include one or more customer-specified functions that should be executed as part of fulfilling the request from the client electronic device 105. Functions are programs or scripts that include sets of instructions to perform various tasks. Exemplary can be compiled or interpreted at runtime. For example, functions may be specified using Python, Node.js, PowerShell, or other languages. Functions may be stateful (e.g., one or more variables associated with the function are maintained between executions) or stateless (e.g., no preservation of data between executions). Exemplary stateless functions may perform tasks such as data substitutions, image processing, or other tasks that do not require memory. Exemplary stateful functions may perform tasks such as those performed by stateless functions but further perform tasks that require memory such as tracking the number of times a particular resource is accessed, maintaining a session state in communications with the client electronic device 105, etc. For example, Company A may have specified a function that increments a counter anytime certain errors occur during the delivery of a resource.

If a function is specified, the configuration data can also include when the function should be run relative to the sequence of operations that the proxy server carries out in order to fulfill a request. For example, the customer can specify functions to be executed at one or more trigger points, such as (1) upon receipt of an inbound request from the client electronic device 105, (2) upon sending a request to fetch the resource to the origin content data store 130, (3) upon receiving a response from the origin content data store 130, and/or (4) upon sending a response to the client electronic device 105. Other trigger conditions may be imposed to control whether the function is triggered at the trigger point (e.g., at trigger point (1) where the inbound request was requested by a particular client electronic device 105).

If the configuration data includes a function, the proxy server 120 submits the function to the function execution unit 135 at the specified trigger point. In some embodiments, the proxy server 120 also sends the entirety of the configuration data that included the function to the function execution unit 135. In some embodiments, the function may modify the requested resource, so the proxy server 120 also sends the resource to the function execution unit 135 (e.g., the resource available at trigger points (3) or (4), above).

As the name suggests, the function execution unit 135 executes functions. In one embodiment, the function execution unit 135 is a job scheduler that receives jobs (e.g., function execution requests), executes the jobs, and returns the results. In some embodiments, the function execution unit 135 is lightweight in that it does not rely on virtualization or containerization during execution of jobs. Additional details regarding the function execution unit 135 are provided below with reference to FIG. 2.

The function execution unit 135 determines whether the function is a stateful function. Stateful functions may be identified with a flag in the configuration data, based on an identifier of the function, or by preprocessing the function instructions to determine whether there is a retrieval of state. Note that state generally refers to one or more variables that are maintained between executions of a function. Such state variables may be separately referenced within the function or, in some languages, referenced as part of a single state object associated with the function. If the function is a stateful function, the function execution unit 135 fetches the state associated with the function from the function state cache server 140. In some embodiments, the state object or variables are transferred in an interchange or markup format such as Extensible Markup Language (XML) or JavaScript Object Notation (JSON). The request to fetch a state associated with a function can include an identifier of the state so that the function state cache server 140 can locate the appropriate state data. Because the memory resources of the computer system hosting the function state cache server 140 are finite and the function state cache server 140 is caching the state of many functions, the function state cache server 140 is backed by a POP function state cache server 143, which in turn is backed by a function state data store 145. The POP function state cache server 143 and/or the function state data store 145 can be volumes provided by the storage service of the provider network 100, in some embodiments. Note that the function state data store 145 can vary between customers. For example, a database hosted by the provider network 100 for one customer could be the function state data store 145 for that customer's functions. As another example, another customer could have created a service (not shown) that executes on a compute instance hosted by the provider network 100. Such a service could serve as the function state data store 145 for the other customer.

In operation, the function state cache server 140 can check whether it has cached the state associated with the function and, if so, return it to the function execution unit 135. If not, the function state cache server 140 can request the state from the POP function state cache server 143. The presence of the function state cache server 140 reduces a bottleneck in execution if all states had to be retrieved from the POP function state cache server 143. Depending on whether the POP function state cache server 143 has the requested state cached, it can return the state to the function state cache server 140 or fetch it from the function state data store 145. In some embodiments, the POP function state cache server 143 is combined with the POP content cache server 125. In some embodiments, the function state data store 145 is combined with the content origin data store 130. The function state cache server 140 and the POP function state cache server 143 may employ various caching policies to determine when to cache function states retrieved from their respective backing (e.g., evicting other states based on their last access) and to ensure consistency or eventual consistency across POP function state cache servers 143 within POPs 180.

In some embodiments, the function state cache server 140 includes a flag to limit concurrent updates. For example, the function execution unit 135 can fetch the state of function A from the function state cache server 140 as part of executing a first instance of function A. Upon sending the state to the function execution unit 135, the function state cache server 140 can lock the state by setting the flag. While executing function A, the function execution unit 135 may attempt to fetch the state of function A again as part of executing a second instance of function A. In some embodiments, the function state cache server 140 can delay fulfilling the later request of a function execution unit until an earlier request of a function execution unit returns an updated state (clearing the flag). In other embodiments, the function state cache server 140 can send an error to the function execution unit issuing the later request to cause it to retry at a later time.

Having received the state from the function state cache server 140, the function execution unit 135 executes the function. As a stateful function, the function can modify and update the state and perform other operations such as modifying the resource to be fetched from the POP content cache server 125 (e.g., after trigger point (1)) or to be returned to the client electronic device 105 (e.g., at trigger point (4)). The function execution unit 135 returns the result of the function execution to the proxy server 120, which can proceed with processing the request from the client electronic device 105. The function execution unit 135 also sends the updated state to the function state cache server 140 for storage.

The provider network 100 can provides a variety of types of computing-related resources such as compute resources (e.g., executing virtual machine (VM) instances and/or containers, executing batch jobs, executing code without provisioning servers) and a storage service that provides data/storage resource as described above. To provide these and other computing-related resources, provider networks 100 often rely upon virtualization techniques. For example, virtualization technologies may be used to provide compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. For example, virtualization technologies may also be used to provide data/storage resources (e.g., a virtual volume or drive that a customer can use to store content). In some embodiments, the proxy server 120, the function execution unit 135, the function state cache server 140, the pop content cache server 125, the POP function state cache server 143, the content origin data store 130, and/or the function state data store 145 are provided by such virtualization technologies.

Although the execution of stateful functions described herein is within the context of a POP of a CDN, other embodiments may employ the execution of stateful functions as described herein outside of such a setting. For example, the execution of stateful functions triggered based on other network traffic besides content requests can be employed in within a data center.

Figure 2:
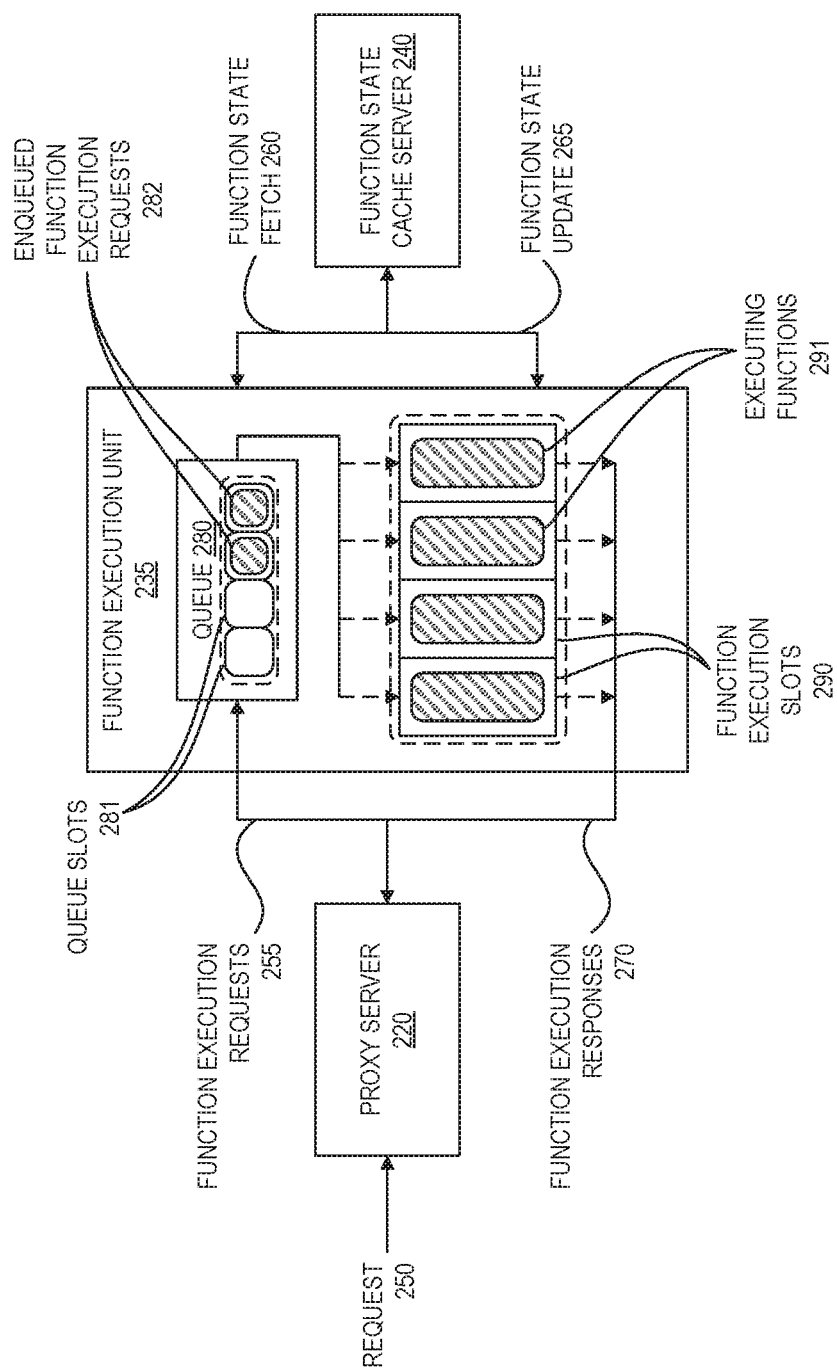
FIG. 2 is a diagram illustrating a message flow for stateful computing according to some embodiments.

FIG. 2 is a diagram illustrating a message flow for stateful computing according to some embodiments. At a high level, a proxy server 220 (e.g., the proxy server 120 of FIG. 1) receives a request 250 for a resource (e.g., from a client electronic device). The proxy server 220 evaluates the request against configuration data, as described above, and, if a function is triggered, issues a function execution request 255 to a function execution unit 235 (e.g., the function execution unit 135 of FIG. 1). As part of handling a stateful function, the function execution unit 235 sends a request 260 to fetch the function's state from a function state cache server 240 (e.g., the function state cache server 140 of FIG. 1). As further part of handling the stateful function, the function execution unit 235 sends a request 265 to update the function's state with the function state cache server 240. As further part of handling the stateful function, the function execution unit 235 sends a function execution response 270 that includes the result of the function execution to the proxy server 220.

In some embodiments, the request 250 includes an identifier of the requested resource (e.g., a URI to content) and an identifier of the source of the request (e.g., the client electronic device 105).

In some embodiments, the function execution request 255 includes the function or an identification of the function to be executed. The function execution request 255 may further include a request identifier to later be referenced in the function execution response 270. In some embodiments, the function to be executed is included in the configuration data, described above, and the function execution request 255 includes the configuration data. If the function is triggered after obtaining the requested resource (e.g., at trigger points (3) or (4), above), the function execution request 255 can further include the resource so that during execution the function has access to the resource (e.g., to modify it).

In some embodiments, the request 260 to fetch the state includes an identifier of the state. For example, when a customer creates a stateful function, a service of the provider network 100 can assign a state associated with the function a unique identifier. In some embodiments, the identifier is a combination of one or more of a customer identifier that uniquely identifier the customer, a function identifier that uniquely identifies the function, and a state identifier that uniquely identifies a state (e.g., Customer_ID.State_ID). If state variables are separately referenced within a function, the identifier can specify which state variable is being requested (e.g., Customer_ID.Variable_ID). In some embodiments, the customer can reference the identifier in other functions. In some embodiments, the function execution unit 235 can derive an index from the identifier included with the request 260, such as by hashing the identifier, to send to the function state cache server 240.

In some embodiments, the request 265 to update the state includes the updated state and the identifier of the state to allow the function state cache server 240 to update the state.

In some embodiments, the function execution response 270 includes an indication that the function execution is complete and may include the request identifier included with request 255. Additionally, if the function created or modified the content or resource to be sent in response to the request 250, the function execution response 270 includes such content or resource.

Messaging may be synchronous or asynchronous. In the synchronous case, the requestor can wait for a response that includes the requested data. For example, the function execution unit 235 can send a request for a function's state to the function state cache server 240 and wait for a response from the function state cache server 240 that includes the function's state. Such a scenario might limit performance based on a cap on the number of outstanding requests or other limit and the time it takes to receive the response (e.g., the function execution unit 235 has to wait for the function state cache server 240 to fetch a state from a POP function state cache server (not shown) in the case of a miss). In the asynchronous case, the message can be assigned an identifier and, sometime later, a response that references the identifier can be sent that includes the requested data. The sender and recipients can track pending requests using the identifier. For example, the function execution unit 235 can send a request for a function's state to the function state cache server 240 which assigns an identifier to the request and returns the identifier to the function execution unit 235. Sometime later the function state cache server 240 can send a message that includes message identifier and the requested the function's state.

In some embodiments, the function execution unit 235 includes a queue 280. As illustrated, the queue 280 includes four queue slots 281, two of which are filled with function execution requests 282. The function execution unit 235 further includes a plurality of function execution slots 290. In some embodiments, the function execution unit 235 is a multi-threaded application and the slots 290 correspond to the number of threads the function execution unit 235 can spawn. As shown, the function execution unit 235 includes four slots 290, each of which is indicated as executing a function 291. As executing functions 291 complete, the function execution unit 235 begins executing the next enqueued function execution request 282. Note that both the enqueued function execution requests 282 and the executing functions 291 may be functions of many different customers of the provider network.

Figure 3:
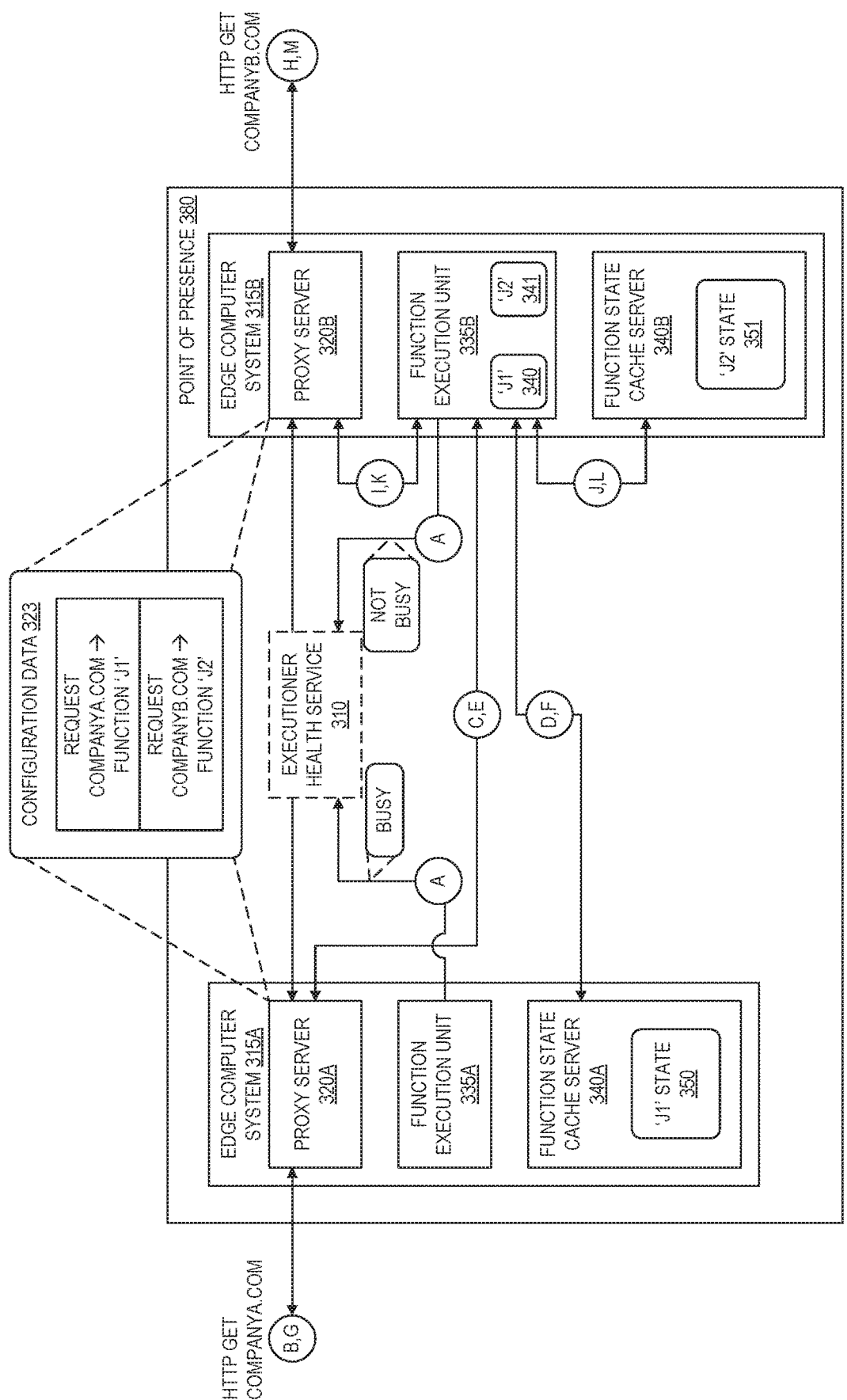
FIG. 3 is a diagram illustrating an example message flow through another environment for stateful computing at the edge according to some embodiments.

FIG. 3 is a diagram illustrating another environment for stateful computing at the edge according to some embodiments. As illustrated, a POP 380 (e.g., the POP 180) includes an edge computer system 315A and an edge computer system 315B (e.g., edge computer systems 115). The edge computer systems 315A, 315B respectively include proxy servers 320A, 320B (e.g., proxy servers 120, 220), function execution units 335A, 335B (e.g., function execution units 135, 235), and function state cache servers 340A, 340B (e.g., function state cache servers 140, 240). As described above, each of the proxy servers 320, function execution units 335, and function state cache servers 340 can be separately addressable on a network of the POP 380 by an IP address or an IP address and port number. In this manner, the communications amongst the proxy servers 320, function execution units 335, and function state cache servers 340 can be considered a mesh network. Such an interconnection allows the resource requirements of stateful computing at the edge to be distributed amongst computer systems of the POP so that a given edge computer system 315 is not subject to a high compute load while another edge computer system 315 is subject to a relatively low compute load. Furthermore, state can be stored in a distributed manner to limit the amount of churn amongst the function state cache servers 340 and between the function state cache servers 340 and a pop function state cache server (not shown). Note that while only two edge computer systems 315 are illustrated, a POP 380 typically has many more edge computer systems (e.g., dozens, hundreds, or more) to form a much larger mesh amongst proxy servers 320, function execution units 335, and function state cache servers 340.

The function execution units 335 send their status to the proxy servers 320 so that the proxy servers 320 can intelligently dispatch function execution requests. The status may be specified in a number of ways. For example, the status may be a percentage CPU utilization, a number of idle execution slots such as the above-described function execution slots 290, number of available queue slots such as the above-described queue slots 281, etc. In some embodiments, the status may be a simple busy/not busy indicator (as shown) that indicates whether the function execution unit 335 can accept another function execution request. The function execution units 335 may periodically send their status information or send it once their utilization has reached some threshold (e.g., 90% CPU, full queue, etc.).

In some embodiments, the function execution units 335 directly send their status to the proxy servers 320. That is, each function execution unit 335 sends its status to each of the proxy servers 320 (e.g., the function execution unit 335A sends status data to the proxy servers 320A, 320B). In other embodiments, the function execution units 335 indirectly send their status to the proxy servers 320 via an executioner health service 310. The executioner health server 310 may be an application hosted on a computer system of the POP 380 that aggregates the received status information and distributes it to the proxy servers 320. Such aggregation limits the amount of message traffic amongst the function execution units 335 and the proxy servers 320 so that each function execution unit 335 sends one status message to the executioner health service 310 and each proxy server 320 receives only one status message from the executioner health service 310.

Based on the received status data, the proxy servers 320 can select a function execution unit 335 to execute a triggered function based on some policy. If the status data is binary (e.g., busy or not busy), the policy can be a round-robin or random selection from those function execution units 335 that are not busy. If a more granular form of status data is sent, the policy can select a least busy function execution unit 335 (e.g., where least is defined as the one with the fewest queued function execution requests, lowest CPU utilization, etc.). Once a proxy server 320 has selected a function execution unit 335, the proxy server 320 can send a function execution request (e.g., the request 255).

As part of executing a function, the function execution unit 335 can check whether the function is stateful and, if so, fetch the associated state(s). As described above, the state of a function may be referenced by an identifier (e.g., Customer_ID.State_ID, Function_ID.Variable_ID). The function execution unit 335 can locate a state by applying a hash function to at least a portion of the identifier, in some embodiments. In particular, the function execution unit 335 can derive a hash from the identifier and, based on a hash table or map that relates hashes to function state cache servers 340, determine which of the function state cache servers 340 cache the state data. This allows the available memory resources of all of the edge computer systems 315 to be pooled (e.g., if the POP includes ten function state cache servers 340 and there are 1000 states, each function state cache server can be responsible for managing a cache for 100 states). In some embodiments, a consistent hashing mechanism is employed to limit the amount of remapping of state data amongst function state cache servers 340 as they come online or go offline. Once the function execution unit 335 has identified the function state cache server 340 responsible for caching the function's state, the function execution unit 335 can send a message to the function state cache server 340 fetch the function's state (e.g., the request 260). Upon receipt of a request for a function's state, the function state cache server 340 reads the state from memory on the hosting edge computer system 315 if the state is cached or from a memory backing if the state is not presently cached (e.g., the POP function state cache server 143) and sends the state to the requesting function execution unit 335.

In some embodiments, the function execution unit 335 pre-fetches state, for example, when a function is queued for execution to reduce the execution time of the function by eliminating the delay associated with messaging between the function execution unit 335 and the function state cache server 340.

An example sequence of operations is described with reference to the encircled letters 'A' through 'M'. In this example, the provider network is hosting two websites: companya.com and companyb.com. Configuration data 323 indicates a stateful function 'J1' is to be executed upon the request of companya.com and a stateful function 'J2' is to be executed upon the request of companyb.com. The function state cache server 340A stores J1's state 350 and the function state cache server 340B stores J2's state 351.

At circle 'A', the function execution units 335 send their status either directly to the proxy servers 320 or indirectly via an executioner health service 310. As shown, the function execution unit 335A has provided a busy indication, and the function execution unit 335B has provided a not busy indication (which may be omitted, if, for example, proxy servers default to assuming a silent function execution unit 335 is available).

In processing a request for companya.com, the proxy server 320A receives a request (e.g., request 250) to retrieve the website (e.g., index.html) as indicated at circle 'B'. Based on the configuration data 323, the proxy server 320A determines that function 'J1' is to be executed upon receiving a request for companya.com. Since the function execution unit 335A has provided a busy indication, the proxy server 320A selects the function execution unit 335B and sends a message to the function execution unit 335B to execute the function (e.g., request 260), as indicated at circle 'C'. The function execution unit 335B identifies function 'J1' as a stateful function and determines that the state of function 'J1' is cached by the function state cache server 340A (e.g., based on the hashing described above). The function execution unit 335B fetches the state of function 'J1' by sending a request (e.g., request 260) to the function state cache server 340A, as indicated at circle 'D'. The function execution unit 335B executes the function and returns a result (e.g., response 270) and updates the function's state (e.g., request 265) as indicated at circles 'E' and 'F', respectively. Upon receiving the result, the proxy server 320A sends the requested website to the requestor, as indicated at circle 'G'.

In processing a request for companyb.com, the proxy server 320B receives a request (e.g., request 250) to retrieve the website (e.g., index.html) as indicated at circle 'H'. Based on the configuration data 323, the proxy server 320B determines that function 'J2' is to be executed upon receiving a request for companyb.com. Since the function execution unit 335A has provided a busy indication, the proxy server 320B selects the function execution unit 335B and sends a message to the function execution unit 335B to execute the function (e.g., request 260), as indicated at circle 'I'. The function execution unit 335B identifies function 'J2' as a stateful function and determines that the state of function 'J2' is cached by the function state cache server 340B (e.g., based on the hashing described above). The function execution unit 335B fetches the state of function 'J1' by sending a request (e.g., request 260) to the function state cache server 340B, as indicated at circle 'J'. The function execution unit 335B executes the function and returns a result (e.g., response 270) and updates the function's state (e.g., request 265) as indicated at circles 'K' and respectively. Upon receiving the result, the proxy server 320B sends the requested website to the requestor, as indicated at circle 'M'.

Figure 4:
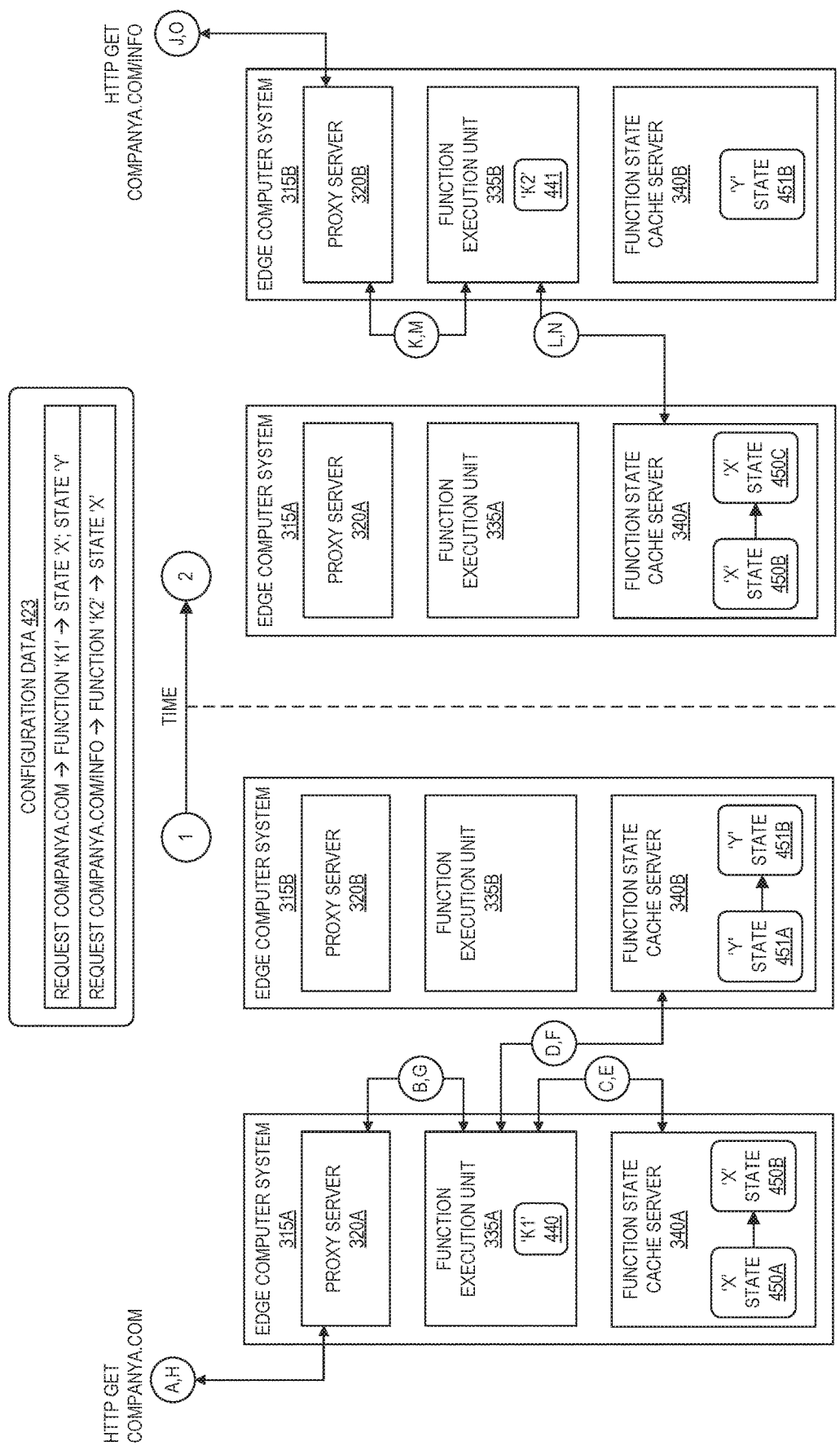
FIG. 4 is a diagram illustrating another example message flow through the environment of FIG. 3 according to some embodiments.

FIG. 4 is a diagram illustrating another example message flow through the environment of FIG. 3 according to some embodiments. The illustrated embodiment includes the above-described edge computer systems 315A, 315B and their respective proxy servers 320A, 320B, function execution units 335A, 335B, and function state cache servers 340A, 340B. In this example, the provider network is hosting two websites: companya.com and companya.com/info. Configuration data 423 indicates stateful functions 'K1' is to be executed upon the request of companya.com, and a stateful function 'K2' is to be executed upon the request of companya.com/info. The function 'K1' references two states, 'X' and 'Y,' and the function 'K2' references state 'X.' The function state cache server 340A stores state 'X' 450 and the function state cache server 340B stores state 'Y' 451. The left portion of FIG. 4 illustrates the execution of function 'K1' at time 1 in response to a request for companya.com, and the right portion of FIG. 4 illustrates the execution of function 'K2' at time 2 (sometime later) in response to a request for companya.com/info. The letter suffixes on state 'X' 450 and state 'Y' 451 denote the changes to state as functions are executed.

In processing a request for companya.com at time 1, the proxy server 320A receives a request (e.g., request 250) to retrieve the website as indicated at circle 'A'. Based on the configuration data 423, the proxy server 320A determines that function 'K1' is to be executed upon receiving a request for companya.com. Assuming the function execution unit 335A is no longer busy, the proxy server 320A selects the function execution unit 335A and sends a message to the function execution unit 335A to execute the function (e.g., request 260), as indicated at circle 'B'. The function execution unit 335A identifies function 'K1' 440 as a stateful function, determines that the function 'K1' 440 references state 'X' 450 and state 'Y' 451, and identifies the function state cache server 340A as storing state 'X' 450 and the function state cache server 340B as storing state 'Y' 451 (e.g., based on the hashing described above). The function execution unit 335A fetches the state 'X' 450A by sending a request (e.g., request 260) to the function state cache server 340A, as indicated at circle 'C'. The function execution unit 335A also fetches the state 'Y' 451A by sending a request (e.g., request 260) to the function state cache server 340B, as indicated at circle 'D'. The function execution unit 335A executes the function and returns a result (e.g., response 270) as indicated at circle 'G.' In executing the function, the function execution unit 335A updates state 'X' from 450A to 450B and state 'Y' from 451A to 451B and sends those updated states (e.g., request 265) to their respective function state cache servers 340A, 340B, as indicated at circles 'E' and 'F', respectively. Upon receiving the result of the execution of functions from the function execution unit 335A, the proxy server 320A sends the requested website to the requestor, as indicated at circle 'H'.

In processing a request for companya.com/info sometime later at time 2, the proxy server 320B receives a request (e.g., request 250) to retrieve the website as indicated at circle 'J'. Based on the configuration data 423, the proxy server 320B determines that function 'K2' is to be executed upon receiving a request for companya.com/info. The proxy server 320B selects the function execution unit 335B and sends a message to the function execution unit 335B to execute the function (e.g., request 260), as indicated at circle 'K'. The function execution unit 335B identifies function 'K2' 441 as a stateful function, determines that the function 'K2' 441 references state 'X' 450, and identifies the function state cache server 340A as storing state 'X' 450 (e.g., based on the hashing described above). The function execution unit 335B fetches the state 'X' 450B—updated by the earlier execution of function 'K1' 440—by sending a request (e.g., request 260) to the function state cache server 340A, as indicated at circle 'L'. Note that if the request at circle T was received sometime after state 'X' 450A was checked out but before it was updated as state 'X' 450B at circle 'E', the function execution unit 335B may have to wait for state 'X' to be unlocked (e.g., a write lock flag was cleared) prior to receiving the state, as described herein. Upon receiving the state 'X' 450B, the function execution unit 335B executes the function and returns a result (e.g., response 270) as indicated at circle 'M.' In executing the function, the function execution unit 335B updates state 'X' from 450B to 450C and sends the updated state (e.g., request 265) to the function state cache servers 340A as indicated at circle 'N.' Upon receiving the result of the execution of function 'K2' from the function execution unit 335B, the proxy server 320B sends the requested website to the requestor, as indicated at circle 'O'.

FIG. 5 is an exemplary stateful function 500 for execution at the edge according to some embodiments. As indicated in comments, function 500 triggers in a response from an origin of the requested content (e.g., trigger point (3), above). If the response includes an HTTP status code that indicates an error, the function replaces the status code with a normal status code and inserts a body into the response. As indicated at line 505, the function further retrieves a state object associated with the function with a getState( ) function, increments a variable of the state object that tracks the number of times the response was in error, and stores the updated state object with a setState( ) function.

Figure 6:
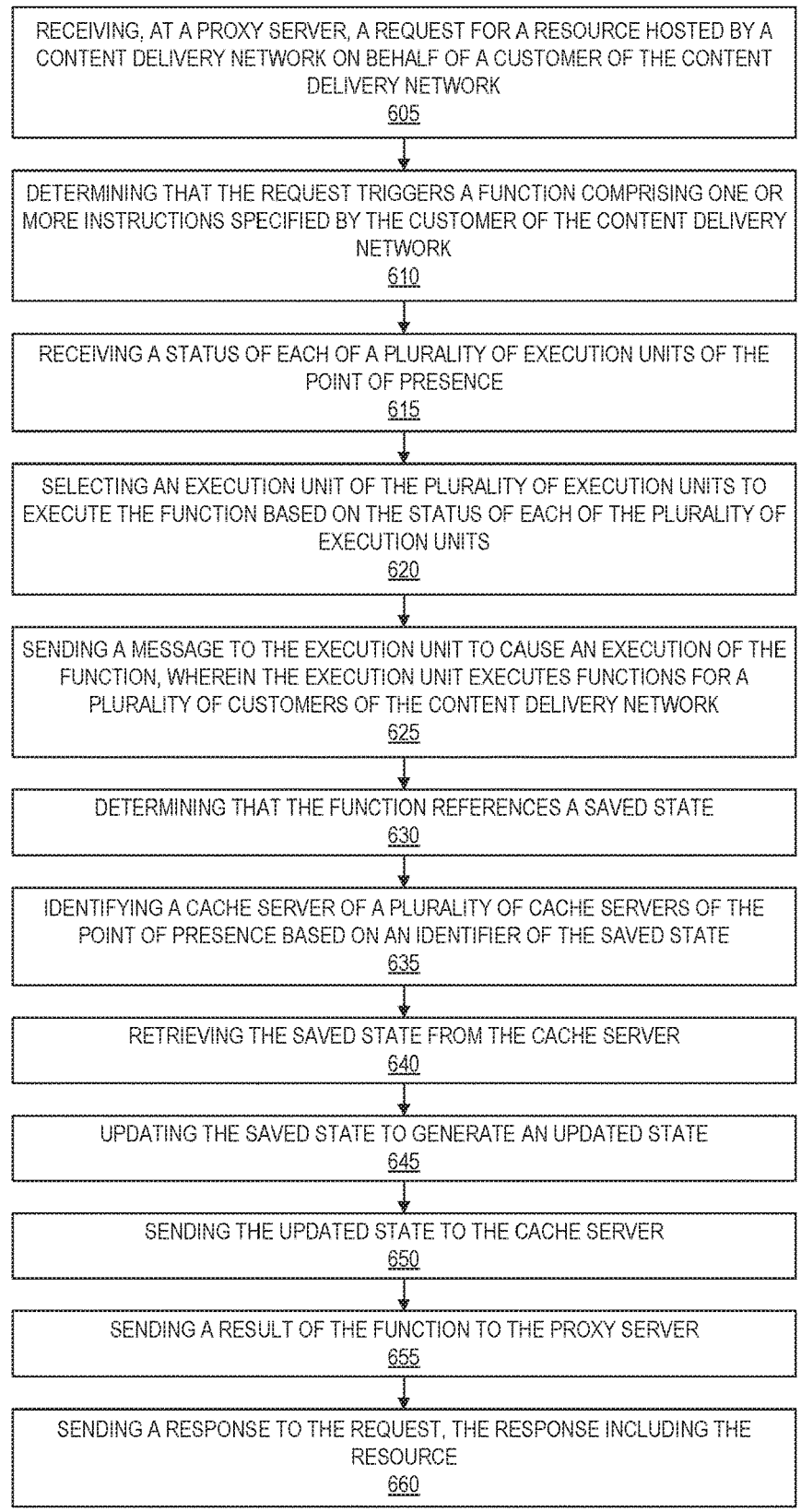
FIG. 6 is a flow diagram illustrating operations of a method for stateful computing at the edge according to some embodiments.

FIG. 6 is a flow diagram illustrating operations of a method for stateful computing at the edge according to some embodiments. Some or all of the operations of the method (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by processes or applications (e.g., proxy servers, function execution units, and function state cache servers of the other figures) running on a computer system (e.g., the edge computer systems of the other figures).

The operations include, at block 605, receiving, at a proxy server, a request for a resource hosted by a content delivery network on behalf of a customer of the content delivery network. As described herein, a POP of the CDN can have proxy servers that handle the retrieval of content or resources hosted on behalf of customers in response to requests. For example, a proxy server might fetch a replica of a web page to deliver in response to a request to get the web page. As shown in FIG. 1, each POP may include many different proxy servers running on different computer systems of the POP.

The operations further include, at block 610, determining that the request triggers a function comprising one or more instructions specified by the customer of the content delivery network. As described herein, some CDNs permit customers to specify functions to be executed as part of the delivery of content or resources of the customer. In handling a request, a proxy server can trigger a function at certain points, such as upon receiving the request, upon sending a request to fetch the requested content, upon receiving the requested content, or upon sending the requested content to the origin of the request, for example. Such functions may be stateless or stateful, the latter preserving one or more variables of the function between separate executions of the function.

The operations further include, at block 615, receiving a status of each of a plurality of execution units of the point of presence. As described herein, execution units execute the functions specified by customers of the CDN. To share the compute resources of each of the execution units when distributing functions for execution, execution units can send status information to proxy servers within the POP. Such status information may include the fill level of queue of functions at the execution unit, whether such a queue of functions is full, the level of processor utilization by the execution unit, etc.

The operations further include, at block 620, selecting an execution unit of the plurality of execution units to execute the function based on the status of each of the plurality of execution units. The proxy server can select from the available execution units of the POP based on the status of the execution units to avoid delays associated with executing the function (e.g., if one execution unit has a sizable queue of pending functions for execution and another has none). Note that the selected execution unit may be executing on the same or a different underlying computer system as the proxy server (e.g., proxy server 320A can select function execution unit 335A or 335B, depending on status). To facilitate communications between the proxy servers and the execution units of the POP, each of the proxy servers can send messages to each of the execution units. For example, each of the proxy servers and each of the execution units can vend a network-addressable interface (e.g., a web server) to the other components of the POP.

The operations further include, at block 625, sending a message to the execution unit to cause an execution of the function, wherein the execution unit executes functions for a plurality of customers of the content delivery network, and wherein the message includes the function. As described above, the proxy server can send a function execution request (e.g., request 255) to the execution unit. Note that depending on whether the function is triggered after receiving the requested content or resource, the message may further include the content or resource.

The operations further include, at block 630, determining that the function references a saved state. As described herein, some functions may be stateless while others are stateful. The execution unit can either pre-process the function to determine whether state is referenced to pre-fetch state or execute the function and carry out state retrieval operations when they are encountered. The state of a function may be referenced as a single state object that includes one or more variables or as individual variables of the function.

The operations further include, at block 635, identifying a cache server of a plurality of cache servers of the point of presence based on an identifier of the state. As described herein, in some embodiments, the memory required to cache states within a POP is distributed using a hash map that associates certain states with certain cache servers. Based on a hash of, for example, an identifier of the state, the execution unit can identify which cache server is responsible for caching the function's state. Note that the cache server may be executing on the same or a different computer system as one or both of the proxy server and the execution unit. Like the proxy servers and execution units, the cache servers, the cache servers can vend a network-addressable interface (e.g., a web server) to the other components of the POP.

The operations further include, at block 640, retrieving the saved state from the cache server, at block 645, updating the saved state to generate an updated state, and at block 650, sending the updated state to the cache server. During function execution, the execution unit performs the instructions of the function, which, for stateful functions, include updating the function's state.

The operations further include, at block 655, sending a result of the function to the proxy server. The result may be an indication that the function has completed or a processed component of the message to execute the function from the proxy server. For example, if the message at block 625 included the content or resource being requested, the function may modify and return the content or resource to the proxy server.

The operations further include, at block 660, sending a response to the request, the response including the resource. As described herein, the response can include the content or resource requested at block 605, which may have been modified by the execution of the function.

Figure 7:
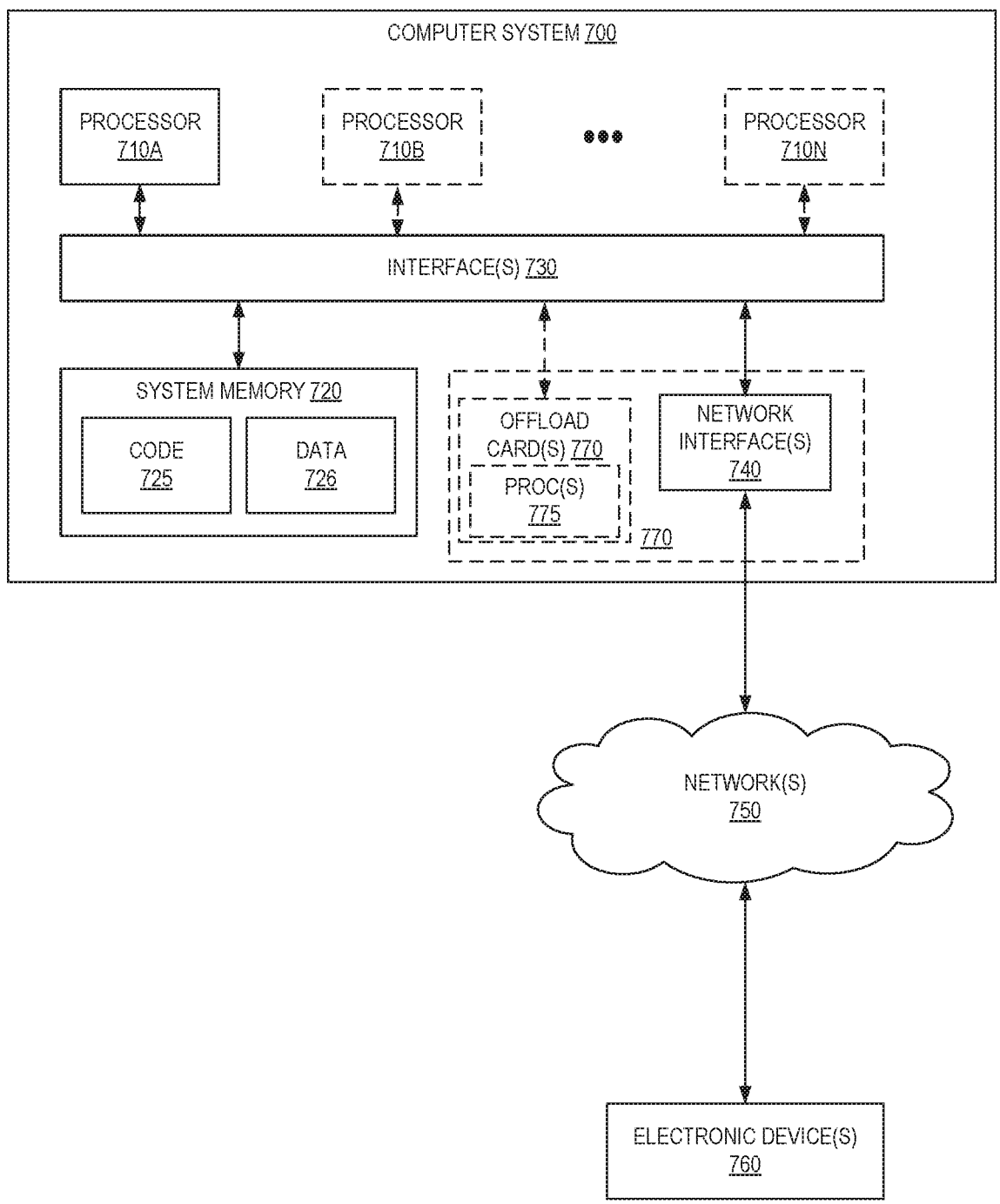
FIG. 7 is a block diagram illustrating an example computer system that may be used in some embodiments.

In some embodiments, a system that implements a portion or all of the techniques for stateful computing at the edge as described herein may include a general-purpose computer system that includes or is configured to access one or more computer-accessible media, such as computer system 700 illustrated in FIG. 7. For example, a computer system 700 can be used to implement the proxy server 120, the function execution unit 135, the function state cache server 140, the pop content cache server 125, the POP function state cache server 143, the content origin data store 130, and/or the function state data store 145. In the illustrated embodiment, computer system 700 includes one or more processors 710 coupled to a system memory 720 via an input/output (I/O) interface 730. Computer system 700 further includes a network interface 740 coupled to I/O interface 730. While FIG. 7 shows computer system 700 as a single computing device, in various embodiments a computer system 700 may include one computing device or any number of computing devices configured to work together as a single computer system 700.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 710 may commonly, but not necessarily, implement the same ISA.

System memory 720 may store instructions and data accessible by processor(s) 710. In various embodiments, system memory 720 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 720 as code 725 and data 726.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices 760 attached to a network or networks 750, such as other computer systems or devices as illustrated in FIG. 1, for example. In various embodiments, network interface 740 may support communication via any suitable wired or wireless general data networks, such as types of Ethernet network, for example. Additionally, network interface 740 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 700 includes one or more offload cards 770 (including one or more processors 775, and possibly including the one or more network interfaces 740) that are connected using an I/O interface 730 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 700 may act as a host electronic device (e.g., operating as part of a hardware virtualization service) that hosts compute instances, and the one or more offload cards 770 execute a virtualization manager that can manage compute instances that execute on the host electronic device. As an example, in some embodiments the offload card(s) 770 can perform compute instance management operations such as pausing and/or un-pausing compute instances, launching and/or terminating compute instances, performing memory transfer/copying operations, etc. These management operations may, in some embodiments, be performed by the offload card(s) 770 in coordination with a hypervisor (e.g., upon a request from a hypervisor) that is executed by the other processors 710A-710N of the computer system 700. However, in some embodiments the virtualization manager implemented by the offload card(s) 770 can accommodate requests from other entities (e.g., from compute instances themselves), and may not coordinate with (or service) any separate hypervisor.

In some embodiments, system memory 720 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 700 via I/O interface 730. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 700 as system memory 720 or another type of memory. Furthermore, a computer-accessible medium may include transmission media or signals such as electrical, electromagnetic, or digital signals, conveyed via a communication medium such as a network and/or a wireless link, such as may be implemented via network interface 740.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Furthermore, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 115A-115N, 180A-180M) may be used to indicate that there can be one or multiple instances of the referenced entity in various embodiments, and when there are multiple instances, each does not need to be identical but may instead share some general traits or act in common ways. Furthermore, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving, by a proxy server of a point of presence of a content delivery network, a request for a resource hosted by the content delivery network on behalf of a customer of the content delivery network;
determining, by the proxy server, that the request triggers a function comprising one or more instructions specified by the customer of the content delivery network;
receiving, by the proxy server, a status of each of a plurality of execution units of the point of presence;
selecting, by the proxy server, an execution unit of the plurality of execution units to execute the function based on the status of each of the plurality of execution units;
sending, by the proxy server, a message to the execution unit to cause an execution of the function, wherein the execution unit executes functions for a plurality of customers of the content delivery network, and wherein the message includes the function;
executing the function, by the execution unit, comprising:
determining that the function references a saved state;
identifying a cache server of a plurality of cache servers of the point of presence based on an identifier of the saved state;
retrieving the saved state from the cache server;
updating the saved state to generate an updated state;
sending the updated state to the cache server; and
sending a result of the function to the proxy server; and
sending, by the proxy server, a response to the request, the response including the resource.

2. The computer-implemented method of claim 1, wherein each of the plurality of execution units and each of the plurality of cache servers are addressable on a network of the point of presence, and wherein communications between the proxy server and the execution unit and between the execution unit and the cache server are based on an inter-process communications protocol.

3. The computer-implemented method of claim 1, wherein identifying the cache server from the plurality of cache servers is based in part on a hash of at least a portion of the identifier of the saved state.

4. A computer-implemented method comprising:
receiving, by a proxy server of a point of presence of a content delivery network, a request for a resource hosted by the content delivery network;
determining, by the proxy server, that the request triggers a function comprising one or more instructions;
selecting, by the proxy server, an execution unit of a plurality of execution units of the point of presence, wherein the execution unit executes functions for a plurality of customers of the content delivery network;
sending, by the proxy server, a message to the execution unit to cause an execution of the function;
executing the function, by the execution unit, comprising:
retrieving a saved state for the function from a cache server of a plurality of cache servers of the point of presence;
updating the saved state to generate an updated state;
sending the updated state to the cache server; and
sending a result of the function to the proxy server; and
sending, by the proxy server, a response to the request, the response including the resource.

5. The computer-implemented method of claim 4, wherein each of the plurality of execution units and each of the plurality of cache servers are addressable on a network of the point of presence, and wherein communications between the proxy server and the execution unit and between the execution unit and the cache server are based on an inter-process communications protocol.

6. The computer-implemented method of claim 4, further comprising:
receiving, by a second proxy server of the point of presence, a second request for a second resource hosted by the content delivery network;
determining, by the second proxy server, that the second request triggers a second function comprising one or more instructions, wherein the second function is different than the function;
selecting, by the second proxy server, a second execution unit of the plurality of execution units of the point of presence, wherein the second execution unit executes functions for a plurality of customers of the content delivery network;
sending, by the second proxy server, a second message to the second execution unit to cause an execution of the second function;
executing the function, by the second execution unit, comprising:
retrieving the updated state for the second function from the cache server;
updating the updated state of the function to generate a second updated state;
sending the second updated state to the cache server; and
sending a result of the function to the proxy server; and
sending, by the proxy server, a response to the request, the response including the resource.

7. The computer-implemented method of claim 4, wherein the message includes the function and an identifier of the saved state, and wherein executing the function further comprises:
determining that the function references the saved state; and
identifying the cache server from the plurality of cache servers based in part on a hash of at least a portion of the identifier of the saved state.

8. The computer-implemented method of claim 4, further comprising:
receiving, by the proxy server, a status of one or more of the plurality of execution units; and
selecting an execution unit based on the one or more statuses.

9. The computer-implemented method of claim 8, wherein the status of a particular execution unit includes at least one of a first indication of a level of CPU utilization of the particular execution unit, a number of available slots within a queue of functions of the particular execution unit, and a second indication that the particular execution unit is busy.

10. The computer-implemented method of claim 4, wherein the saved state is an object that comprises one or more variables and a value of at least one of the one or more variables was set during a previous execution of the function.

11. The computer-implemented method of claim 4, wherein each of the proxy server, the execution unit, and the cache server are executed by different computer systems of the point of presence.

12. The computer-implemented method of claim 4, wherein the resource is hosted on behalf of a customer of the plurality of customers of the content delivery network and the function is specified by the customer.

13. The computer-implemented method of claim 4, wherein the function is triggered upon at least one of receiving the request, sending a second request for the resource to a content origin server; receiving a second response that includes the resource from the content origin server, and sending the response to the request.

14. A system comprising:
an execution unit implemented by a first electronic device of a point of presence of a content delivery network, wherein the execution unit executes functions for a plurality of customers of the content delivery network, the execution unit including instructions that upon execution cause the execution unit to:
receive a message to cause an execution of a function, the function including one or more instructions; and
retrieve a saved state for the function from a cache server of a plurality of cache servers of the point of presence;
update the saved state to generate an updated state;
send the updated state to the cache server; and
send a result of the function; and
a proxy server implemented by a second electronic device of the point of presence;
the proxy server including instructions that upon execution cause the proxy server to:
receive a request for a resource hosted by the content delivery network;
determine that the request triggers the function;
select the execution unit from a plurality of execution units of the point of presence;
send the message to the execution unit to cause the execution of the function; and
send a response to the request, the response including the resource.

15. The system of claim 14, wherein each of the plurality of execution units and each of the plurality of cache servers are addressable on a network of the point of presence, and wherein communications between the proxy server and the execution unit and between the execution unit and the cache server are based on an inter-process communications protocol.

16. The system of claim 14, wherein the resource is hosted on behalf of a customer of the plurality of customers of the content delivery network and the function is specified by the customer.

17. The system of claim 14, wherein the message includes the function and an identifier of the saved state, and wherein the execution unit includes further instructions that upon execution cause the execution unit to:
determine that the function references the saved state; and
identify the cache server from the plurality of cache servers based in part on a hash of at least a portion of the identifier of the saved state.

18. The system of claim 14, wherein the proxy server includes further instructions that upon execution cause the proxy server to:
receive a status of one or more of the plurality of execution units; and
select an execution unit based on the one or more statuses.

19. The system of claim 18, wherein the status of a particular execution unit includes at least one of a first indication of a level of CPU utilization of the particular execution unit, a number of available slots within a queue of functions of the particular execution unit, and a second indication that the particular execution unit is busy.

20. The system of claim 14, wherein the saved state is an object that comprises one or more variables and a value of at least one of the one or more variables was set during a previous execution of the function.

* * * * *